May 12, 1925.
F. SWAN
SWIVEL JAR WIRE ROPE SOCKET
Filed Aug. 7, 1924
1,537,203
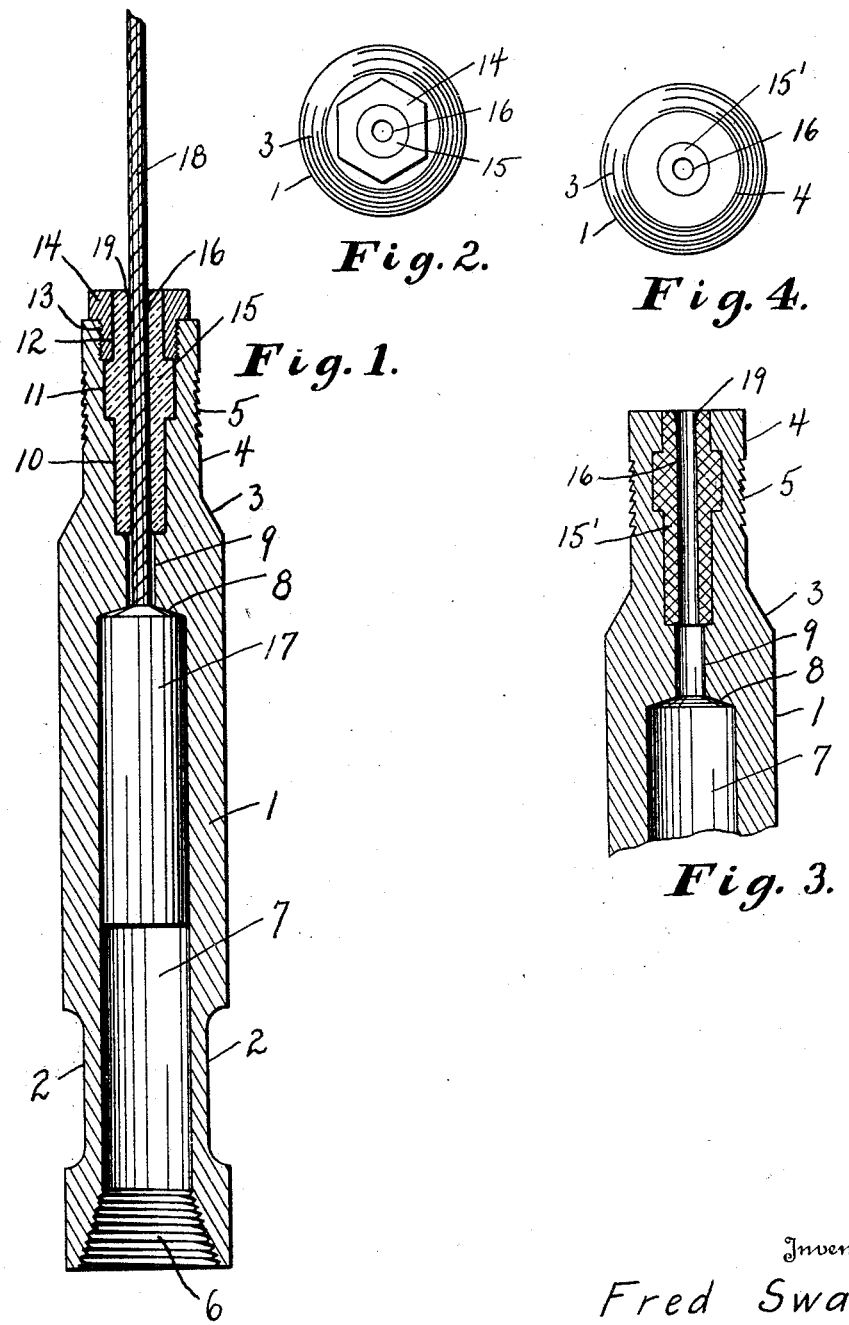

Patented May 12, 1925.

UNITED STATES PATENT OFFICE.

FRED SWAN, OF MARIETTA, OHIO.

SWIVEL JAR WIRE-ROPE SOCKET.

Application filed August 7, 1924. Serial No. 730,561.

*To all whom it may concern:*

Be it known that I, FRED SWAN, a citizen of the United States, residing at Marietta, in the county of Washington and State of Ohio, have invented certain new and useful Improvements in Swivel Jar Wire-Rope Sockets, of which the following is a specification, reference being had to the accompanying drawing, forming a part thereof.

My invention relates to a wire rope protecting swivel socket for use with well drilling tools and has for its object to provide an improvement adapted to minimize or prevent wear of the wire rope used in drilling.

In the use of a swivel jar wire rope socket made substantially like that described in Letters Patent of the United States No. 1,045,883, December 3, 1912, granted to J. E. Prosser, it is found that the turning of the wire line in the neck of the socket during the swiveling operation so wears the line at the top of the socket that it is frequently necessary to cut the line above this point of wear and re-set the swivel. The swivel socket described in the Prosser patent (and described with the addition of my improvement in this specification) is a reliable and useful tool, and it is the particular object of the present invention to provide this tool with means adapted to minimize wear of the wire rope without sacrificing any of its strength or other desirable qualities.

With these objects and other objects hereinafter described in view, my invention comprises the wire rope protecting bearing and the means for retaining it in the swivel as hereinafter described and claimed.

Referring to the drawing:

Figure 1 is a longitudinal sectional view of a wire rope swivel provided with my rope protecting bearing; Figure 2 is a top view of the same but not showing the wire rope; Figure 3 is a partial longitudinal sectional view of a wire rope swivel provided with a modified form of rope protecting bearing; and Figure 4 is a top view of the modification shown in Figure 3.

In the drawings, 1 indicates the body of a Prosser or similar swivel which is cylindrical in shape and is provided with the usual flattened portions 2 adapted to receive a wrench or other gripping device. The upper end of the body 1 tapers at 3 to a smaller cylindrical neck 4 which is preferably provided with grooves 5 adapted to be gripped by the jaws of a fishing tool in case the swivel is lost in a well. The interior of the body 1 is provided at its lower end with a screw threaded portion 6 for attachment to cutting drills, underreamers and the like. Above the threaded portion 6 is a cylindrical chamber 7 extending up to an annular shoulder or abutment 8, above which is a cylindrical passage 9.

Instead of continuing the passage 9 to the top of the swivel, I provide a chamber 10, 11, 12 of which portion 11 is of larger diameter than 10 and 12, portions 10 and 11 being in the neck 4 of the swivel while portion 12 is formed in a screw bushing 14 secured by screw threads 13 in the upper end of neck 4.

A bushing 15, preferably made of bronze or other bearing material, is formed to fit loosely within chamber 10, 11, 12, being inserted before the screw bushing 14 is screwed in place. This bushing 15 is drilled centrally to provide a hole 16 sufficiently large to permit a wire rope 18 to extend therethrough and move freely therein. Hole 16 is preferably rounded at the end as indicated at 19. A wire rope 18 extends through bushing 15 and passage 9 and is securely attached to a piston 17 adapted to fit and move within the chamber 7 in the body 1 of the swivel.

When the swivel is in use, the swiveling action is permitted by the turning of the piston 17 and the wire rope 18 relative to the swivel body 1. An important feature of the Prosser swivel is the relatively large surface of the annular shoulder or abutment 8 which is adapted to withstand the pressure and blows from the piston 17, and the formation of this shoulder integral with the swivel body 1. It will be seen that the provision I make for retaining the bearing bushing 15 does not in any way weaken the construction of the swivel where strength is necessary. As ample clearance for the wire rope 18 is provided in the passage 9, it is clear that the rope cannot come into contact and be worn by the steel of the swivel body. Bearing bushing 15, if made of bronze or other relatively hard bearing material, is preferably arranged to be rotatable in the chamber 10, 11, 12. The screw bushing 14 is provided with a nut so that it may be easily removed, thereby permitting the easy replacement of the bearing bushing 15.

In the modification shown in Figures 3 and 4, the construction is similar to that shown in Figures 1 and 2 except that the screw bushing 14 is omitted. In this construction, the bushing 15' is poured in place and may be made of Babbitt or similar bearing metal.

Having thus described my invention, what I claim is:

1. In a swiveling jarring device for well drilling apparatus comprising a body provided with a relatively large cylindrical bore adapted to receive a cylindrical jar or piston extending upward in said body and terminating in an annular shoulder, and also provided with a rope guiding bore extending upward from said shoulder having the portion immediately above said shoulder of relatively small diameter and having its upper portion of greater diameter, and a bushing having an opening through it for the drill rope secured in said portion of the rope guiding bore of greater diameter.

2. In a swiveling jarring device for well drilling apparatus comprising a body provided with a relatively large cylindrical bore adapted to receive a cylindrical jar or piston extending upward in said body and terminating in an annular shoulder, and also provided with a rope guiding bore extending upward from said shoulder of relatively small diameter and having its upper portion of greater diameter, and a bushing having an opening through it for the drill rope secured in said portion of the rope guiding bore of greater diameter and adapted to rotate freely therein.

3. In a swiveling jarring device for well drilling apparatus comprising a body provided with a relatively large cylindrical bore adapted to receive a cylindrical jar or piston extending upward in said body and terminating in an annular shoulder, and also provided with a rope guiding bore extending upward from said shoulder of relatively small diameter and having its upper portion of greater diameter, a bushing having an opening through it for the drill rope arranged to fit into the rope guiding bore of greater diameter, and a removable retaining bushing adapted to be screwed into the tool body to retain the first bushing in place.

In testimony whereof, I hereunto affix my signature.

FRED SWAN.